(12) United States Patent
Cloutier et al.

(10) Patent No.: US 6,369,679 B1
(45) Date of Patent: Apr. 9, 2002

(54) METHOD AND APPARATUS FOR PROVIDING PERMANENT MAGNETIC SIGNATURES IN BURIED CABLES AND PIPES TO FACILITATE LONG-RANGE LOCATION, TRACKING AND BURIAL DEPTH DETERMINATION

(75) Inventors: Paul A. Cloutier, Nassau Bay; Timothy I. Marzolf, Tomball; Delbert R. Oehme, Bryan; Ronald F. Stebbings, Houston, all of TX (US)

(73) Assignee: Innovatum, Inc., Houston, TX (US)

(*) Notice: Subject to any disclaimer, the term of this patent is extended or adjusted under 35 U.S.C. 154(b) by 0 days.

(21) Appl. No.: 09/292,002

(22) Filed: Apr. 15, 1999

Related U.S. Application Data

(60) Provisional application No. 60/082,469, filed on Apr. 20, 1998.

(51) Int. Cl.[7] .............................................. H01F 13/00
(52) U.S. Cl. ...................................................... 335/284
(58) Field of Search ................................ 335/284, 285, 335/296–306; 385/100–114; 324/326

(56) References Cited

U.S. PATENT DOCUMENTS

| | | | |
|---|---|---|---|
| 3,452,343 A | * 6/1969 | Crank et al. ................. | 335/284 |
| RE29,165 E | * 3/1977 | Bode ............................ | 310/46 |
| 4,427,943 A | 1/1984 | Cloutier et al. ............. | 324/326 |
| 4,465,140 A | 8/1984 | Hoehn, Jr. ................... | 166/381 |
| 4,749,978 A | * 6/1988 | Imamura et al. ............ | 335/284 |
| 5,051,034 A | 9/1991 | Goodman ..................... | 405/157 |
| 5,096,763 A | * 3/1992 | Ogata et al. ................. | 428/76 |
| 5,114,517 A | 5/1992 | Rippingale et al. ......... | 156/187 |
| 5,122,750 A | 6/1992 | Rippingale et al. ......... | 324/326 |
| RE34,701 E | 8/1994 | Goodman ..................... | 156/244 |
| 5,354,521 A | 10/1994 | Goodman ..................... | 264/24 |

* cited by examiner

Primary Examiner—Ramon M. Barrera
(74) Attorney, Agent, or Firm—Miles & Stockbridge P.C.

(57) ABSTRACT

Ferromagnetic material of an elongated object, such as a fiber optic cable, is permanently magnetized in a manner that results in a substantially cylindrically symmetric radial external magnetic field around the object. The produced magnetization is substantially greater than natural magnetization of the ferromagnetic material by the earth's magnetic field. The radial external magnetic field varies periodically along the length of the object. If the wavelength of the periodic variations is long compared to the width (diameter) of the object, the strength of the radial external magnetic field decreases approximately inversely with distance from the object for distances that are small compared to the wavelength. The periodic magnetic field variations may have a square wave or a sine wave pattern, for example. Magnetization of the ferromagnetic material is achieved by a magnetizer having pairs of counter-rotating mirror-image magnets adjacent to an object that is moved longitudinally relative to the magnets. By virtue of the magnetization, buried objects, such as pipes and cables can be detected magnetically at substantial distances from the objects.

77 Claims, 10 Drawing Sheets

(LONGITUDINAL SCALE GREATLY COMPRESSED)

METHOD AND APPARATUS FOR PROVIDING PERMANENT MAGNETIC SIGNATURES IN BURIED CABLES AND PIPES TO FACILITATE LONG-RANGE LOCATION, TRACKING AND BURIAL DEPTH DETERMINATION

CROSS-REFERENCE TO RELATED APPLICATION

This application claims the benefit of Provisional Application No. 60/082,469 filed Apr. 20, 1998, incorporated herein by reference.

BACKGROUND OF THE INVENTION

This invention is concerned with magnetization of ferromagnetic material in elongated objects such as fiber optic cables and is more particularly concerned with providing cables and pipes with permanent magnetic signatures to facilitate their detection magnetically.

Many types of buried pipelines and power and communication cables are either fabricated of ferromagnetic material or employ ferromagnetic material as strength or armor members, making them susceptible to detection magnetically. Larger pipes and cables may, to a certain extent, be detectable magnetically by virtue of their natural magnetization (e.g., due to the earth's magnetic field), but smaller pipes and cables are more difficult to detect magnetically.

Submarine fiber optic communication cables, which are strung by ships across the oceans of the world, must be buried beneath the seabed for protection from sea life, anchors, and trawls, but subsequently they must be located for repairs or maintenance. Conventional means of locating, tracking and determining burial depth of unpowered buried fiber optic communications cables magnetically are limited in capability. Smaller cables in current use are difficult to detect by passive magnetization techniques at slant ranges greater than roughly 0.8 meters. Nevertheless, projected world-wide expansion of the subsea fiber optic communications networks will result in a greater proportion of small cables which are the most difficult to detect.

BRIEF DESCRIPTION OF THE INVENTION

The present invention provides fiber optic cables, and other elongated objects comprising ferromagnetic material, with enhanced permanent magnetic signatures which allow detection, location, tracking and burial depth determination of the objects at unprecedented slant ranges. The invention involves unique methods and apparatus for producing magnetization in ferromagnetic material of elongated objects and provides the objects with strong distinctive magnetic signatures. The invention will be described in its application to fiber optic communications cables, such as those employed in subsea fiber optic communications networks, but it will be apparent that the invention is not limited to such applications and may be employed, more generally, with regard to cables, pipes, or other elongated objects comprising ferromagnetic material.

Magnetization of unpowered fiber optic cables in accordance with the invention can be achieved during the cable laying process, or during the manufacture of the cables, for example, and does not require changes in cable construction or the laying process itself, nor does it interfere in any way with the operation of the fiber optic cable or cause mechanical stress or damage to the cable.

Submarine fiber optic communications cables typically have an optic fiber surrounded by a steel wire strength rope or steel armor. It is known that such cables may have unintended natural magnetization resulting from local magnetic fields (primarily the earth's field) captured at the time of fabrication, but such naturally occurring magnetization of both armored and unarmored cables is generally far less than the saturation field level of the ferromagnetic materials in the cable and is not easily detected. Moreover, the external magnetic fields resulting from naturally-occurring magnetization tend to follow the helical arrangement of the armor or wire ropes and are not uniformly radial or cylindrically symmetric. Passive magnetic detection of the external fields is quite limited. For example, with available detection equipment, burial depth measurement is limited to about 0.9 to 1.2 meters on 40 mm cable, and to about 0.5 to 0.8 meter on 10 mm cable. Continuous tracking and burial depth measurements are made difficult by variations in magnetic field strength along the cables associated with the pitch length of armor or wire ropes.

The present invention produces magnetic fields near saturation in ferromagnetic material of fiber optic cables, or other elongated objects, inducing permanent remnant magnetization. The produced magnetization is much stronger than any natural magnetization of the ferromagnetic material by the earth's magnetic field. An axial gradient in the applied axial (longitudinal) magnetization produces a radial external "leakage" magnetic field around the cable that is substantially cylindrically symmetric and that varies periodically along the length of the cable, providing a strong permanent magnetic signature that can be readily detected by passive magnetic detection methods. The periodic variations in the radial external magnetic field along the cable may have a square wave or a sine wave pattern, for example. If the wavelength of the variations is long enough, the external field strength over most of the cable decreases approximately linearly with distance from the cable.

The desired magnetization can be achieved by the use of a unique magnetizer having a pair of mirror-image magnets (or a plurality of pairs) disposed at opposite sides of the cable, for producing a strong magnetic field adjacent to the cable, which varies repetitively as the cable is moved longitudinally relative to the magnets.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
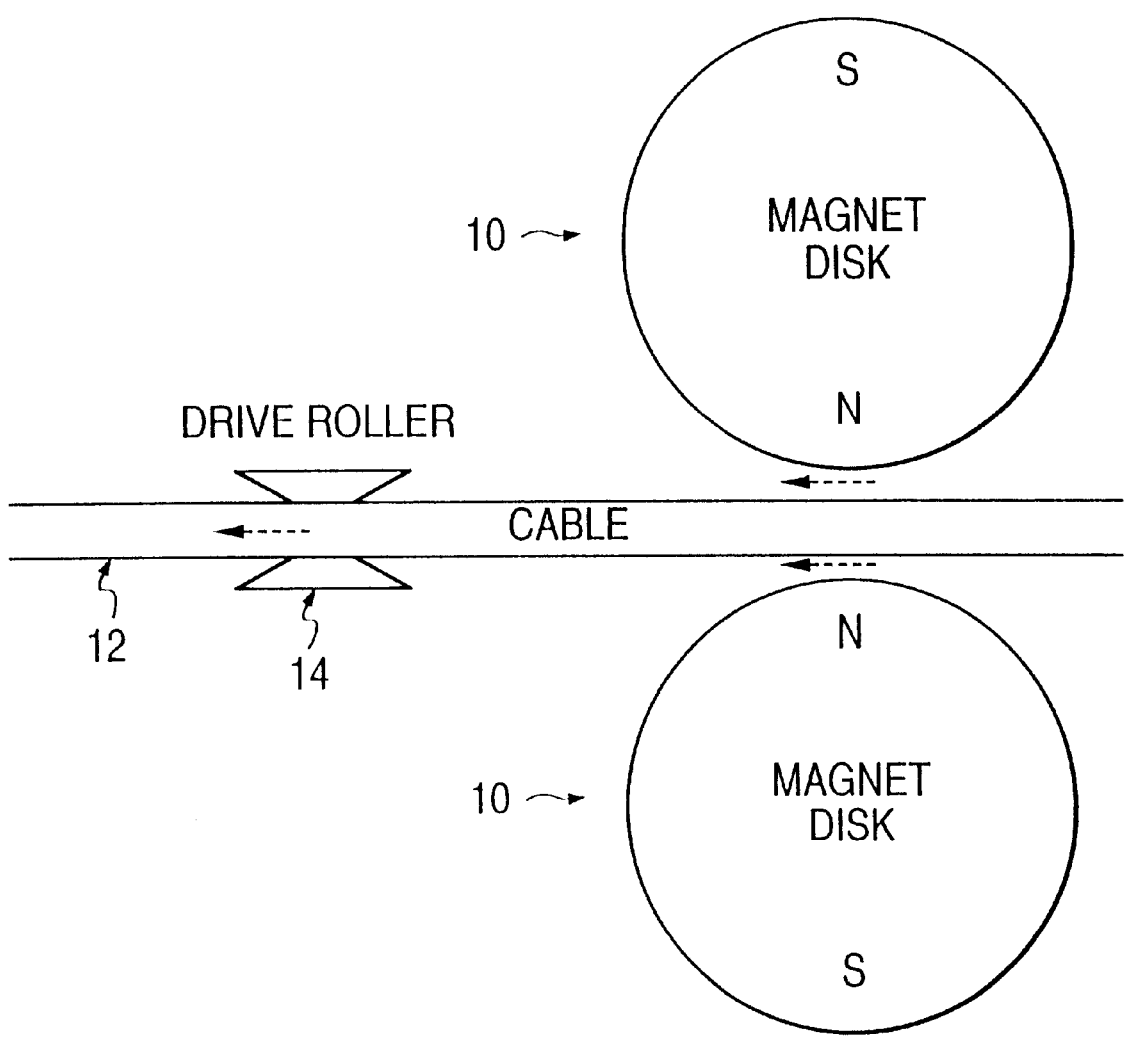
FIG. 1 is the diagrammatic plan view showing a first embodiment of a magnetizer in accordance with the invention.

FIG. 1 shows, diagrammatically, a simple apparatus for producing desired magnetization of a fiber optic cable. The apparatus comprises a magnetizer that includes a pair of strong mirror-image magnets (e.g., rare earth magnets with pole strengths of about 20K Gauss) supported on counter-rotating non-magnetic disks 10 (of aluminum or plastic, for example). Each magnet may be a long permanent bar magnet extending across a disk or shorter bar magnets oppositely mounted adjacent to the periphery of the disk and joined by a length of highly permeable magnetic material.

The cable 12 is driven longitudinally by a suitable tractor drive (not shown), for example, and the disks are disposed close to opposite sides of the cable. Each disk is supported for rotation about an axis perpendicular to the plane of the figure. The rotation of the disks is synchronized so that, while the strength of the magnetic field adjacent to the cable varies with disk rotation, the polarity of the field at one side of the cable is the same as the polarity of the field at the opposite side. A drive mechanism for rotating the disks includes a drive roller 14 driven by the longitudinal movement of the cable and linkages (not shown) connecting the drive roller and the disks. Suitable linkages will be described later.

The applied magnetic field in ferromagnetic material of the cable is near saturation and is much stronger than any natural magnetization (due to the earth's magnetic field, for example), so that it overwrites or erases the natural magnetization throughout the length of the cable (except perhaps at regions of applied field polarity transitions).

The arrangement shown in FIG. 1 produces a repetitive sinusoidal gradient in the cable magnetization and a sinusoidal variation in the radial external magnetic field. Other external magnetic field patterns can be produced by using magnets with various spacings, orientations, and pole strengths around the disk circumference. For example, the magnetizer shown in FIG. 2 comprises a pair of counter-rotating disks 10A of non-magnetic material supporting a plurality of pairs of magnets arranged diametrally, as shown. This arrangement produces repetitive square wave variations in the radial external magnetic field.

Figure 2:
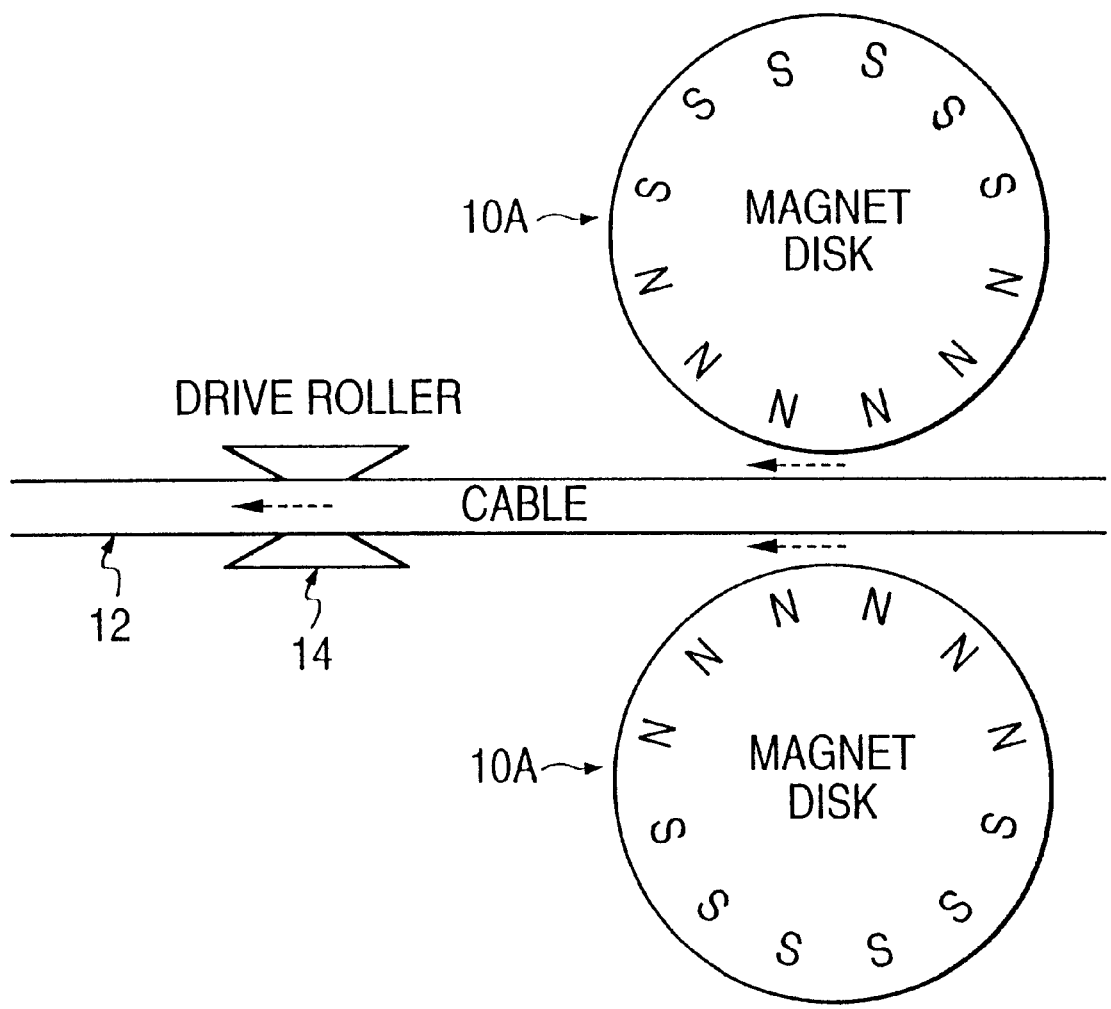
FIG. 2 is a similar view of a second embodiment.
Figure 3:
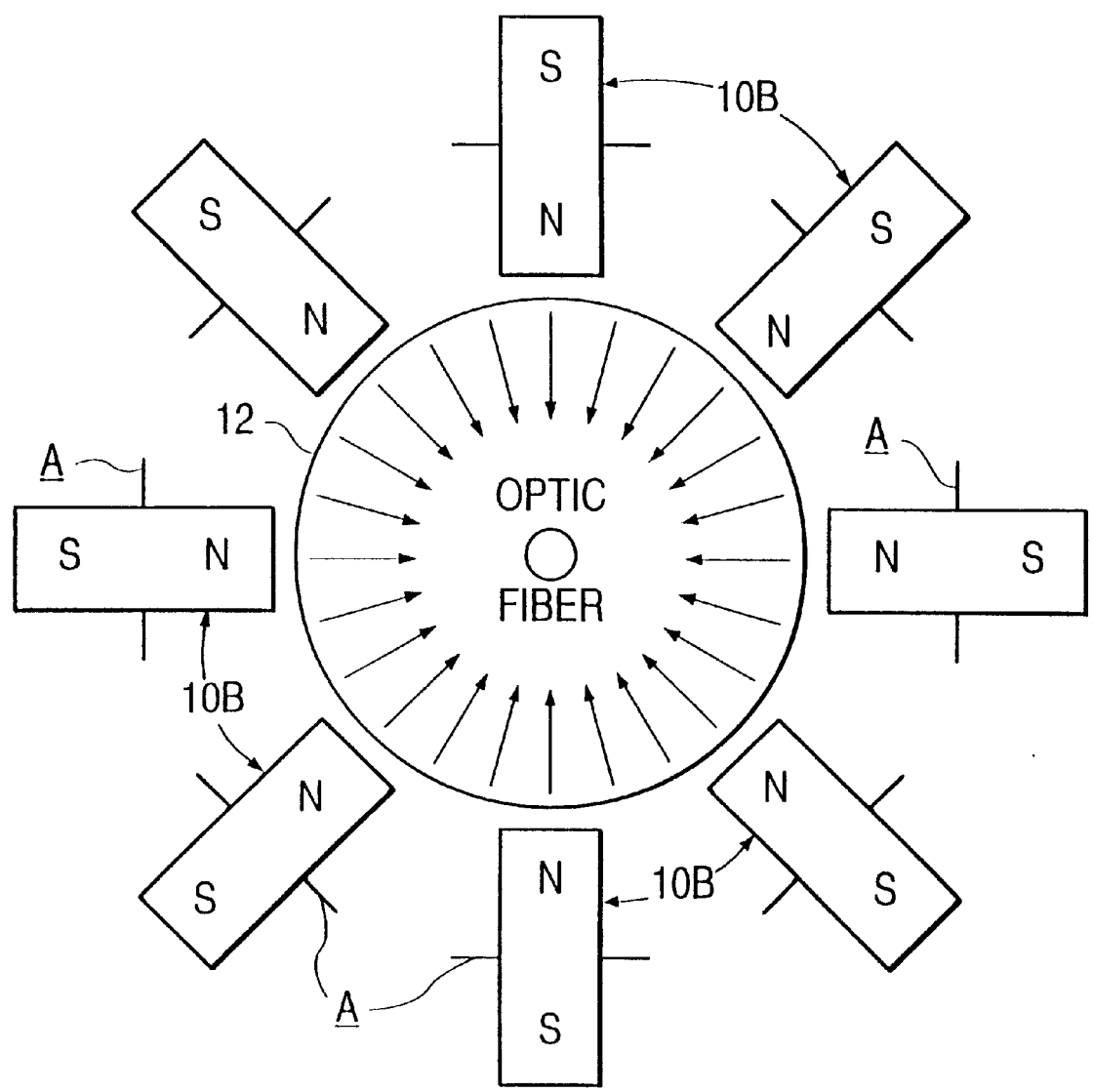
FIG. 3 is a diagrammatic partly sectional elevation view of a third embodiment.

The embodiments shown in FIGS. 1 and 2 are appropriate for magnetizing the strength member or armor of relatively small diameter fiber optic cables. For larger diameter cables, multiple pairs of mirror-image magnets 10B can be employed as shown in FIG. 3, in which a fiber optic cable 12 is shown, diagrammatically, in cross-section. Each magnet of an opposed pair of magnets is rotatable about an axis A that is perpendicular to an axial plane of the cable, and that lies in a plane perpendicular to the longitudinal axis of the cable. The rotation of the magnets is synchronized so that the polarity of the magnetic field applied at all sides of the cable is the same. Of course, the polarity changes as the magnets rotate.

Figure 4:
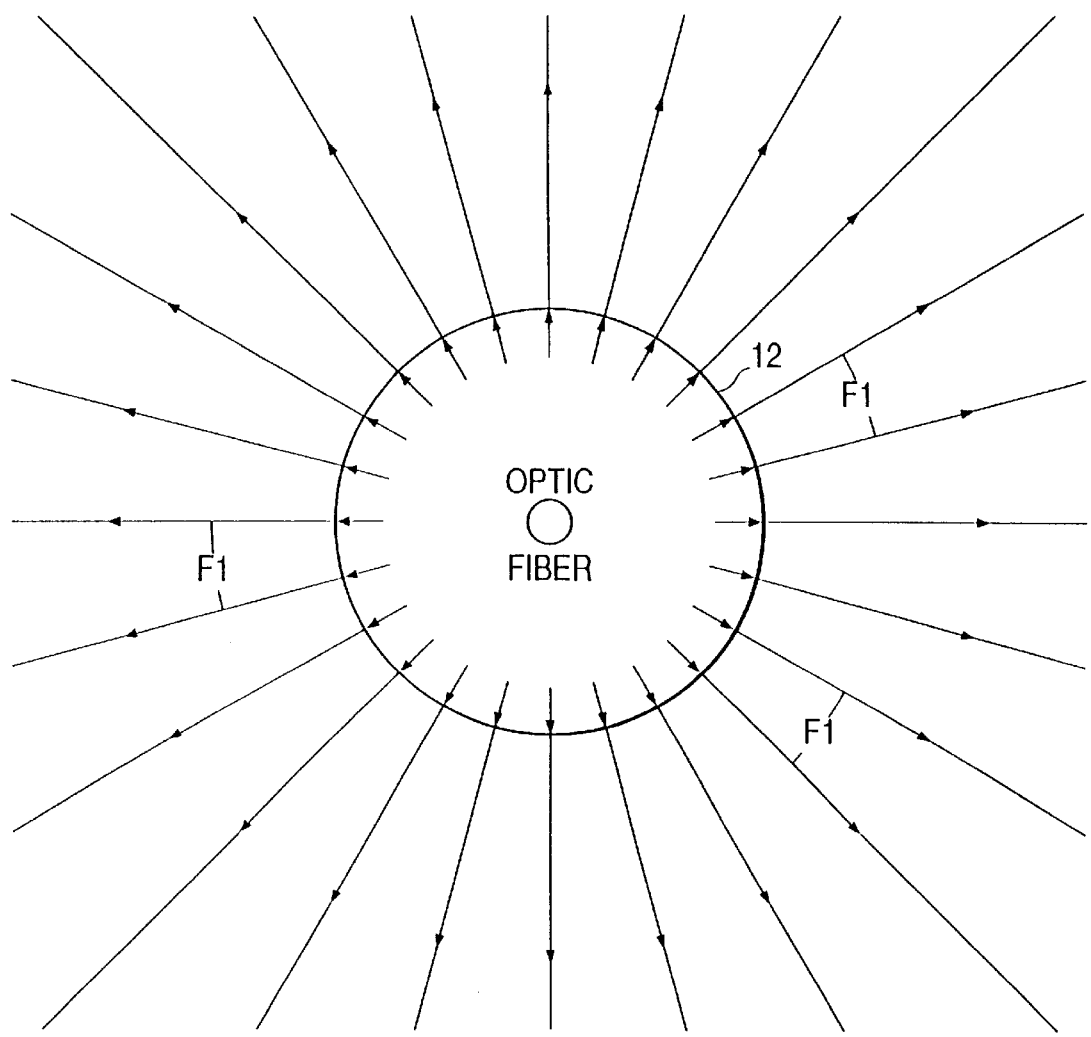
FIG. 4 is a diagrammatic cross-sectional view showing radial flux lines around a fiber optic cable.
Figure 5:
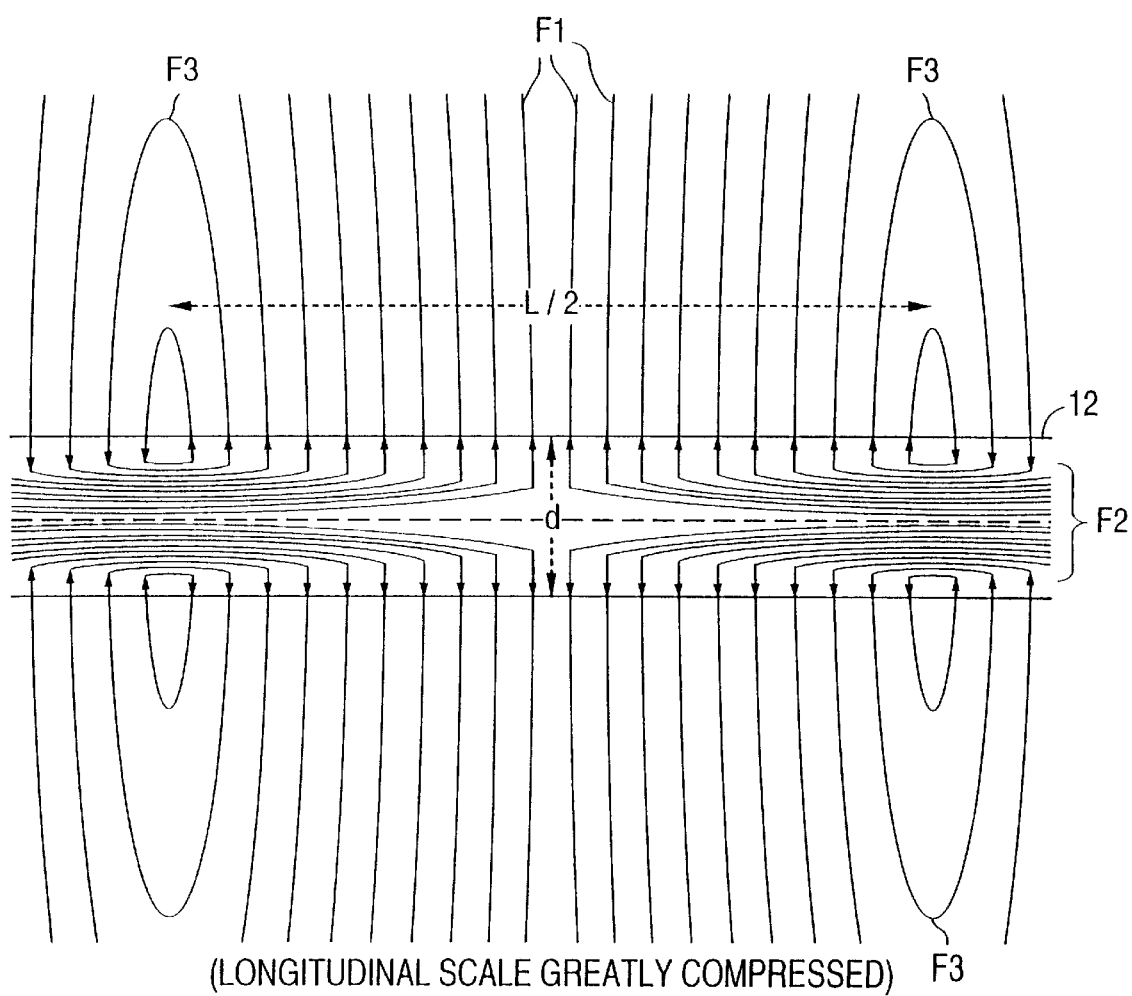
FIG. 5 is a diagrammatic longitudinal sectional view of a fiber optic cable magnetized in accordance with the invention and showing internal axial magnetization and external magnetic flux lines in accordance with a square wave magnetization pattern.
Figure 6:
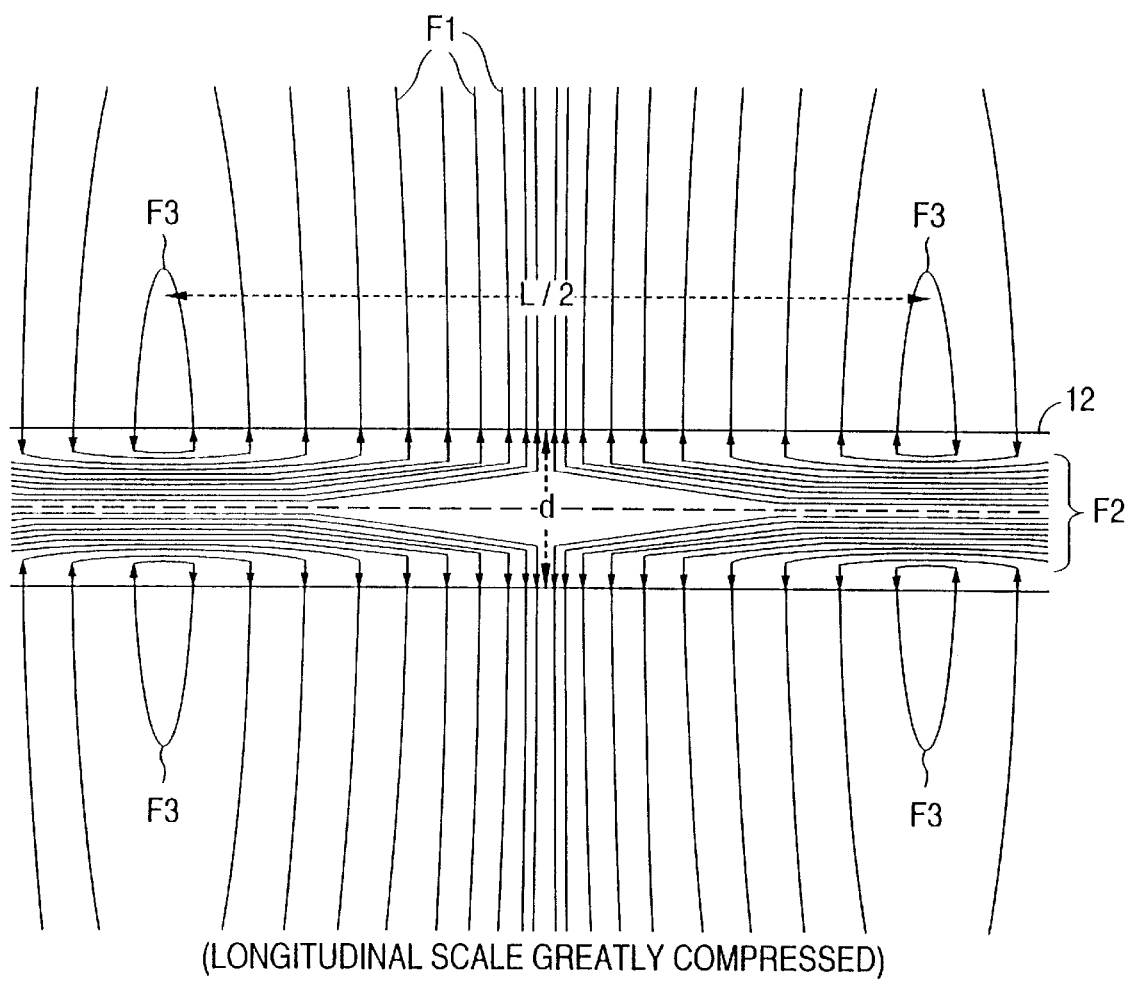
FIG. 6 is a diagrammatic longitudinal sectional view of a fiber optic cable magnetized in accordance with the invention and showing internal axial magnetization and external magnetic flux lines in accordance with a sine wave pattern.

The magnetizers shown in FIGS. 1–3 magnetize the ferromagnetic material of the strength member or armor of the cable such that a cylindrically symmetric radial external field is produced that varies periodically along the length of the cable. As shown in FIGS. 4–6, the cylindrically symmetric external magnetic field has flux lines that extend radially with respect to the cable. The radial flux lines F1 are parts of flux loops having axial parts F2 that extend parallel to the length of the cable, on the surface and/or internally of the cable, and axial parts F3 that extend parallel to the length of the cable externally of the cable.

Along the length of the cable, the external magnetic field includes, repetitively, a region of one polarity followed by a region of the opposite polarity. The alternating regions or zones are of length L/2, where L is the wavelength of the magnetic field variations. In accordance with the invention, it is highly preferred that L be substantially greater than the width or diameter d of the cable perpendicular to its length. In that case, the strength of the external magnetic field decreases approximately linearly with increase in distance from the cable, i.e., there is an inverse relationship between the field strength and the distance from the cable. The relationship may be expressed as 1/R, where R is the distance from the centerline (axis) of the cable perpendicular to the centerline and is small relative to L.

Figure 7:
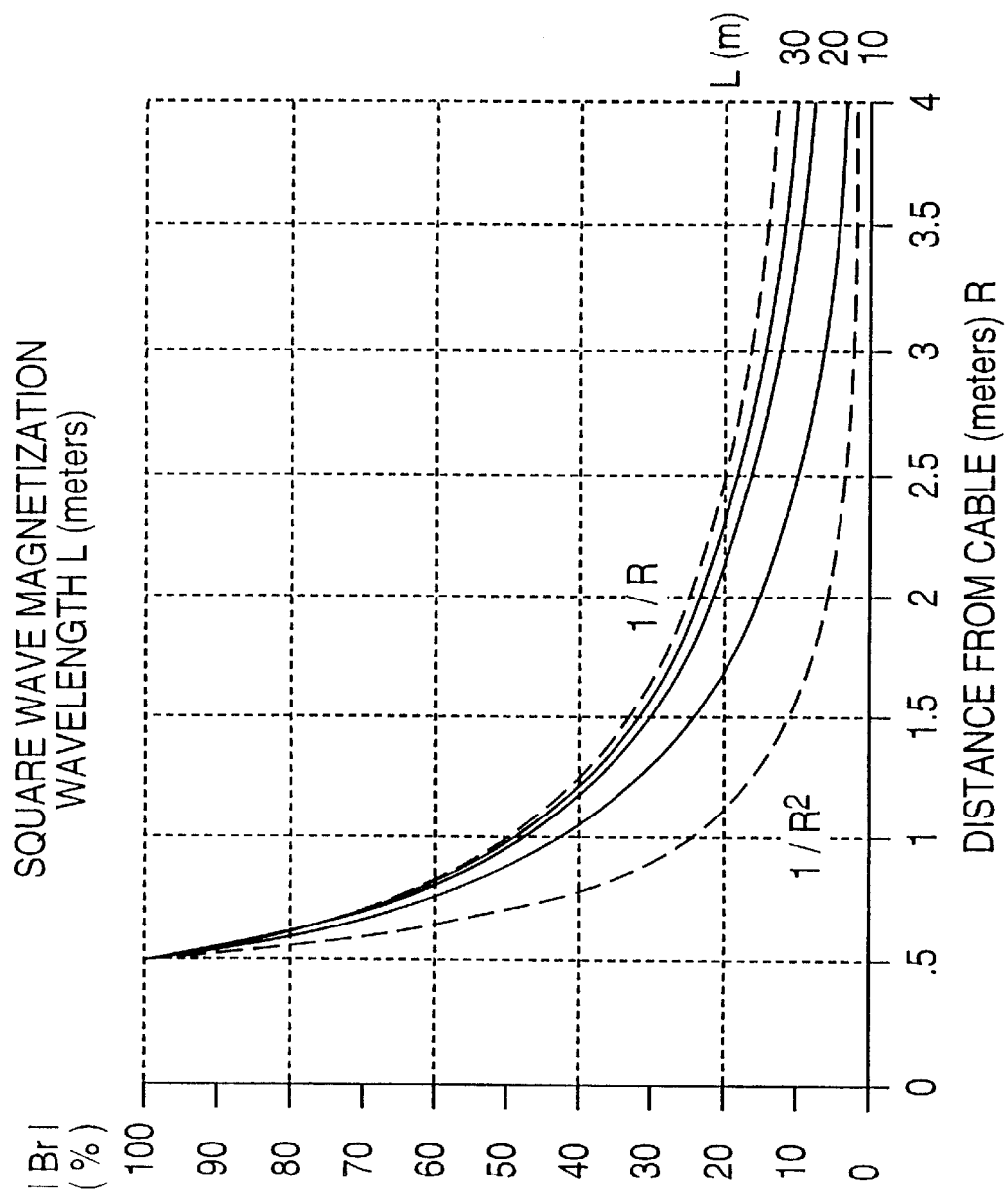
FIG. 7 is a plot of magnetic field radial component magnitude versus radial distance from a cable for various magnetization wavelengths, for square wave magnetization.
Figure 8:
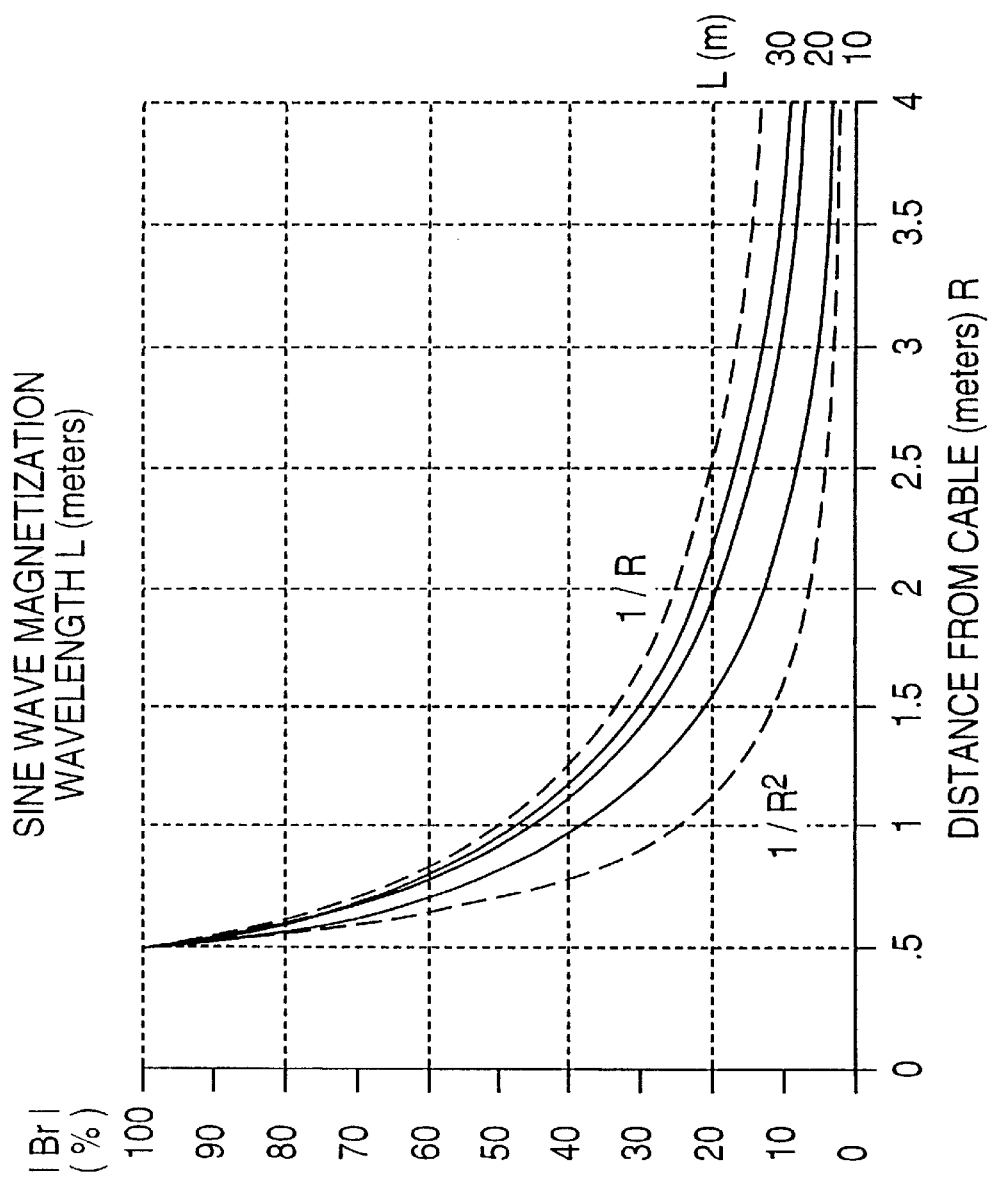
FIG. 8 is a plot of magnetic field radial component magnitude versus radial distance from a cable for various magnetization wavelengths, for sine wave magnetization.

As shown in FIGS. 7 and 8, for the 1/R relationship, the magnetic field radial component magnitude $|Br|$ at distances from the cable that are small relative to wavelength L is substantially greater than that for a $1/R^2$. As shown, the fall-off of the magnitude of the radial external magnetic field with distances R from the center line of the cable is in accordance with $1/R^n$, where n is between 2 and 1. The curves shown in FIGS. 7 and 8 are for wavelengths of 10, 20, 30 meters, but shorter or longer wavelengths may be appropriate. It is apparent that the longer the wavelength L the closer the approximation to 1/R.

For any given wavelength, the wave shape may be adjusted from square wave to sinusoidal. However, for any shape other than sinusoidal (e.g., square wave) the variation in radial field strength with distance R away from the cable is not constant along the cable. The radial variation of the radial field component is a function only of wavelength for sinusoidal magnetization, but varies also with position along the cable for non-sinusoidal magnetization. Thus, the "best" shape for any wavelength is sinusoidal, which also requires the simplest magnetizer configuration (rotating bar magnets).

Figure 9:
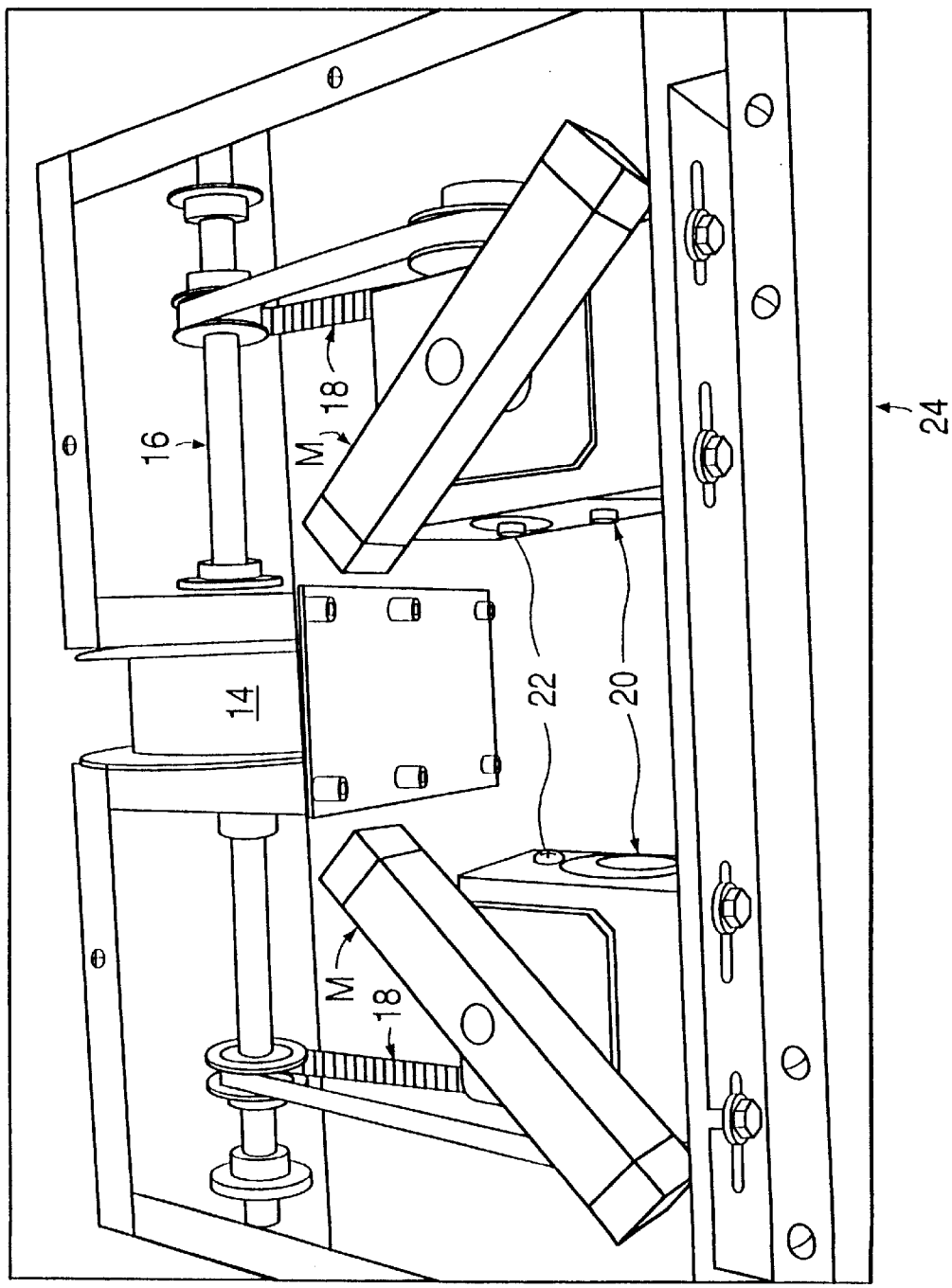
FIG. 9 is a perspective view of an actual magnetizer for small fiber optic cables.

FIG. 9 shows an actual magnetizer for magnetizing small diameter fiber optic cables in accordance with the invention. The drive roller 14 is driven by a cable (not shown) as the cable is moved longitudinally over the drive roller by a conventional tractor drive (not shown). The drive roller is connected to a pair of counter-rotating mirror-image magnets M arranged to be disposed at opposite sides of the cable, by linkages that include drive shafts 16, belt and sprocket couplings 18, and gear boxes 20. In this instance, each magnet M is constituted by a pair of oppositely poled short magnets at the end of a bar of highly permeable magnetic material mounted on a rotational shaft 22. The magnetizer also includes a housing 24 having a cover (not shown) with a guide channel for the cable and a notch for exposing the drive roller.

Figure 10:
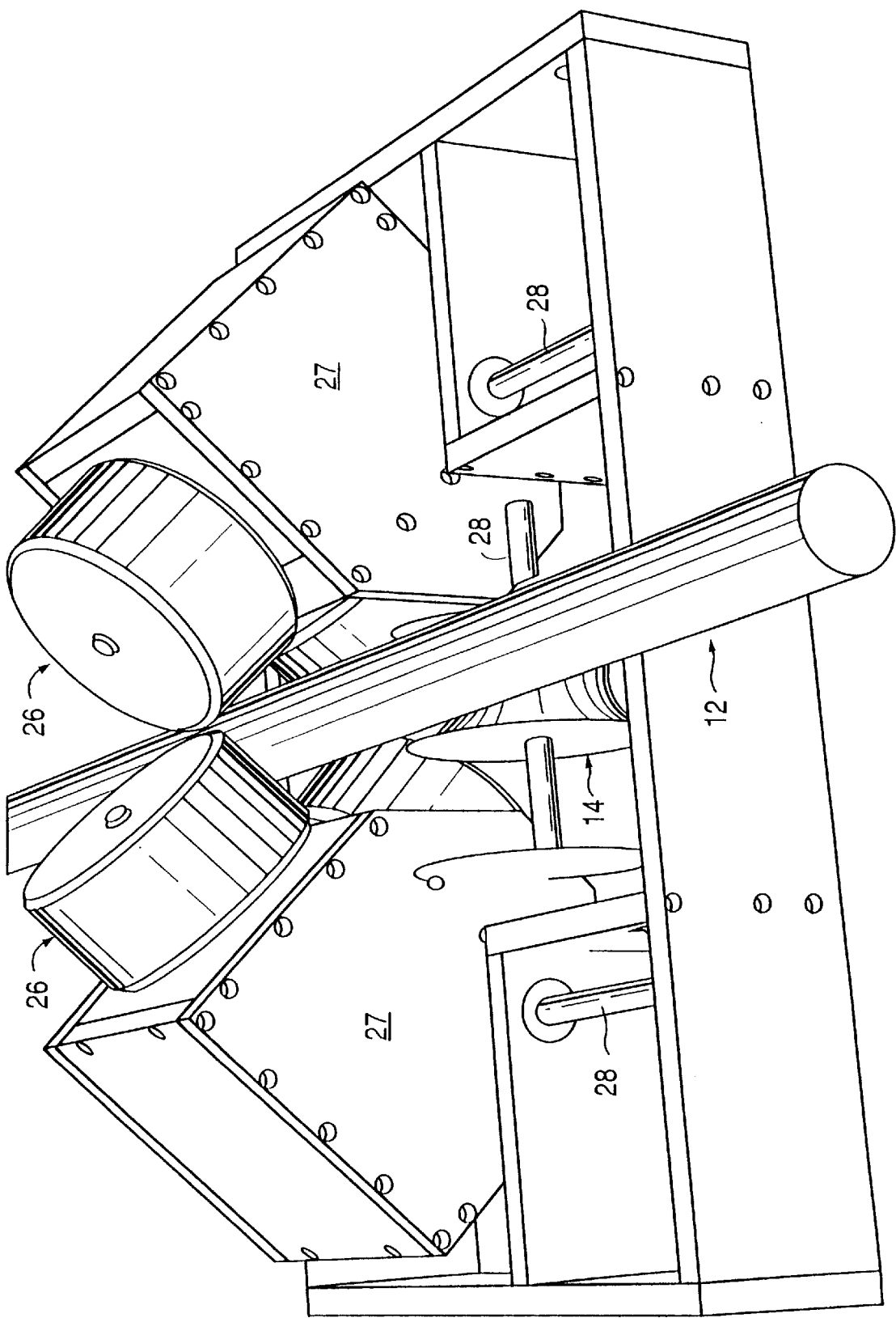
FIG. 10 is a diagrammatic perspective view of a magnetizer for large diameter fiber optic cables.

FIG. 10 shows, diagrammatically, a magnetizer for a large diameter cable, including two pairs of counter-rotating disks 26 carrying mirror-image magnets, the pairs of magnets being arranged around the circumference of a cable 12 that drives a drive roller 14. The drive roller is connected to gear boxes 27, on which the magnet disks are rotatively mounted, by linkages 28 that are shown diagrammatically. These linkages may include belt and sprocket couplings and may also include electrically operated variable ratio gears, clutches and/or brakes in order to vary the pattern of rotation of the disks in response to rotation of the drive roller.

Cable and other elongated objects magnetized in accordance with the invention can be detected, located, and tracked using well-known magnetic detection equipment employing arrays of magnetic sensors such as fluxgate magnetometers or gradiometers. See, for example, the magnetic detection equipment disclosed and claimed in U.S. Pat. No. 4,427,943, incorporated herein by reference.

In actual tests of the invention, on both 51 mm armored cable and 11 mm lightweight unarmored cable, strong external magnetic field signatures were produced, which greatly facilitated accurate horizontal and vertical cable position determination. In both cases, the cables were easily tracked at vertical distances of two meters. The magnetization achieved for the 51 mm armored cable was roughly the same as for a 20-inch diameter steel pipeline, with detection, tracking and depth determination possible at vertical distances approaching 6 meters. The magnetization of the 11 mm unarmored cable was approximately that of a 12-inch diameter pipeline, with detection, tracking and depth determination possible at vertical distances in excess of 4 meters. Both tests involved magnetization that produced a sinusoidal external magnetic field pattern.

Although the magnetizers shown and described employ permanent magnets, electromagnets may also be used. Fixed polarity rotating electromagnets can simply replace the bar magnets. Alternatively, stationary electromagnets can be employed adjacent to a moving cable, and the polarity and strength of the applied magnetic field can be varied electrically. This arrangement can easily be employed to encode data magnetically on the cable, in a digital bar code, for example, which can be read by the magnetic tracking system. Such an arrangement may be used, for example, to mark repeaters or splices along the cable for future location. Similar encoding of data magnetically on the cable can be achieved by varying the rotation of permanent magnets or electromagnets with linear movement of the cable. For example, a microprocessor can be used to control the rotational drive trains via clutches, brakes, and/or variable gear mechanisms. Encoding of data can use wavelength modulation or amplitude modulation, for example, of the applied magnetic field.

Elongated objects having ferromagnetic material can be magnetized (marked) continuously, where continuous tracking is desired, for example, or discontinuously. In discontinuous magnetic marking, discrete, longitudinally-spaced magnetic marks may be applied to wire rope, chain, cable, pipe, or tubing, for example, as event marks, or distance marks for metering out or counting of predetermined lengths of an elongated object. Each discrete region of magnetization, which may be only one wavelength or a few wavelengths long, produces a localized radial external magnetic field that is substantially cylindrically symmetric. With appropriate choice of wavelength, passive magnetic detection can take advantage of the 1/R relationship described earlier. Moreover, it is apparent that the invention is not limited to use with elongated objects that are buried.

While preferred embodiments of the invention have been shown and described, these embodiments are intended to be exemplary, not restrictive, and it will be apparent to those skilled in the art that modifications can be made without departing from the principles and spirit of the invention, the scope of which is set forth in the appended claims.

What is claimed is:

1. A method of producing magnetization in ferromagnetic material of an elongated object, comprising using a magnetizer to apply to a portion of said object a magnetic field that magnetizes the ferromagnetic material in a manner that creates multiple cycles of longitudinal magnetization that extends along the length of the object and that varies continually over each cycle, and that results in multiple cycles of a radial external magnetic field around the object that in substantially cylindrically symmetric and that extends along the length of the object, and providing relative movement between said object and said magnetizer along the length of said object to apply the magnetic field of the magnetizer to another portion of said object.

2. A method according to claim 1, wherein the external magnetic field has radial flux lines the polarity of which varies repetitively along the length of the object.

3. A method according to claim 2, wherein the radial flux lines are parts of flux loops having axial parts that extend along the length of the object on a surface of the object or internally of the object, and having axial parts that extend along the length of the object externally of the object.

4. A method according to claim 1, wherein the cycles of the radial external magnetic field have a wavelength along the length of the object that is greater than the width of the object perpendicular to its length.

5. A method according to claim 4, wherein the wavelength is such that the magnitude of the external magnetic field decreases approximately linearly with distance of at least a meter from the object.

6. A method according to claim 4, wherein the wavelength is a plurality of meters long.

7. A method according to claim 5, wherein the wavelength is a plurality of meters long.

8. A method according to claim 1, wherein the radial external magnetic field has a square wave pattern along the length of the object.

9. A method according to claim 1, wherein the radial external magnetic field has a sine wave pattern along the length of the object.

10. A method according to claim 1, wherein the cycles of longitudinal magnetization are of equal length and the cycles of radial external magnetic field are of equal length.

11. A method of producing magnetization in ferromagnetic material of an elongated object, comprising applying to said object a magnetic field that magnetizes the ferromagnetic material in a manner that creates multiple cycles of longitudinal magnetization that extends along the length of the object and that varies continually over each cycle, and that results in multiple cycles of a radial external magnetic field around the object that is substantially cylindrically symmetric and that extends along the length of the object, wherein the magnetic field is applied during relative lengthwise movement of the object and a magnetizer, and the field applied by the magnetizer has a polarity that varies repetitively.

12. A method according to claim 11, wherein the radial external magnetic field has a square wave pattern along the length of the object.

13. A method according to claim 11, wherein the radial external magnetic field has a sine wave pattern along the length of the object.

14. A method according to claim 11, wherein the cycles of longitudinal magnetization are of equal length and the cycles of radial external magnetic field are equal length.

15. A method of producing magnetization in ferromagnetic material of an elongated object, comprising applying to said object a magnetic field that magnetizes the ferromagnetic material in a manner that results in a radial external magnetic field around the object that is substantially cylindrically symmetric and that varies along the length of the object, wherein the magnetic field is applied during relative lengthwise movement of the object and a magnetizer, and the field applied by the magnetizer has a polarity that varies repetitively, wherein the magnetizer includes a pair of mirror-image magnets disposed at opposite sides of the object and the polarity of which adjacent to the object varies repetitively during the relative movement.

16. A method according to claim 15, wherein the magnetizer includes a plurality of said pairs of magnets disposed around the object.

17. A method according to claim 16, wherein the magnets of each pair rotate about axes that lie in a plane transverse to the length of the object.

18. A method according to claim 15, wherein the magnets rotate about axes that lie in a plane transverse to the length of the object.

19. Apparatus for producing magnetization in ferromagnetic material of an elongated object, comprising a magnetizer that includes a pair of mirror-image magnets arranged to be disposed adjacent to the object at opposite sides thereof, a mechanism that provides guided relative movement of the object and the magnetizer along the length of the object, and a mechanism that repetitively varies the polarity of the magnets adjacent to the object as the object is moved relative to the magnets.

20. Apparatus according to claim 19, wherein the magnetizer includes a plurality of said pairs of magnets arranged to be disposed around the object.

21. Apparatus according to claim 19, wherein each of said magnets has a pair of opposite polarity end portions and the mechanism that repetitively varies the polarity of the magnets comprises a device that counter-rotates the magnets about axes that are substantially perpendicular to a longitudinal axial plane of the object and that lie in a plane substantially perpendicular to the length of the object, and wherein the device that counter-rotates the magnets is coordinated with the movement of the object.

22. Apparatus according to claim 21, wherein the device that counter-rotates the magnets comprises a drive train that includes a drive roller arranged to be rotated by longitudinal movement of the object and a linkage that causes the magnets to rotate in response to rotation of the drive roller.

23. Apparatus according to claim 22, wherein the linkage includes a device that permits variation of the rotation of the magnets in response to rotation of the drive roller.

24. Apparatus according to claim 21, wherein the magnets are supported on rotary disks.

25. A method of providing ferromagnetic material of an elongated object with an external magnetic field for passive magnetic detection, comprising using a magnetizer to apply to a portion of said object a magnetic field that magnetizes the ferromagnetic material in a manner that creates multiple cycles of longitudinal magnetization that extends along the length of the object and that varies continually over each cycle, and that results in multiple cycles of a radial external magnetic field around the object that is substantially cylindrically symmetric and that extends along the length of the object, and providing relative movement between said object and said magnetizer along the length of said object to apply the magnetic field of the magnetizer to another portion of said object.

26. A method according to claim 25, wherein the ferromagnetic material of the object is first magnetized and then the object is buried in the ground.

27. A method according to claim 25, wherein the ferromagnetic material of the object is first magnetized and then the object is placed beneath a body of water.

28. A method according to claim 25, wherein the fall-off of the magnitude of the radial external magnetic field with distance R from the center line of the object is in accordance with $1/R^n$, where n is between 2 and 1.

29. A method according to claim 25, wherein the fall-off of the magnitude of the radial external magnetic field with distance R from the center line of the object is in accordance with $1/R^n$, where n is less than 2.

30. A method according to claim 25, wherein a curve plotting the relationship between the magnitude of the radial external magnetic field and distance R from the center line of the object lies above the curve $1/R^2$ and between the curves $1/R^2$ and $1/R$ shown in FIG. 7.

31. A method according to claim 25, wherein a curve plotting the relationship between the magnitude of the radial external magnetic field and distance R from the center line of the object lies above the curve $1/R^2$ and between the curves $1/R^2$ and $1/R$ shown in FIG. 8.

32. A method according to claim 25, wherein the radial external magnetic field has a square wave pattern along the length of the object.

33. A method according to claim 25, wherein the radial external magnetic field has a sine wave pattern along the length of the object.

34. A method according to claim 25, wherein the cycles of longitudinal magnetization are of equal length and the cycles of radial external magnetic field are of equal length.

35. Apparatus for producing magnetization in ferromagnetic material of an elongated object, comprising a magnetizer, a mechanism for providing guided relative movement of the object and the magnetizer along the length of the object, and means for operating the magnetizer to apply to a portion of the object a magnetic field that magnetizes the ferromagnetic material in a manner that creates multiple cycles of longitudinal magnetization that extends along the length of the object and that varies continually over each cycle, and that results in multiple cycles of a radial external magnetic field around the object that is substantially cylindrically symmetric and that extends along the length of the object.

36. Apparatus according to claim 35, wherein the cycles of longitudinal magnetization are of equal length and the cycles of radial external magnetic field are of equal length.

37. A method of providing a magnetic signature in ferromagnetic material of an elongated object, comprising, applying to said object a magnetic field that magnetizes the ferromagnetic material in a manner that creates multiple cycles of longitudinal magnetization that extends along the length of the object and that varies continually over each cycle, so an to produce multiple cycles of a radial external magnetic field around the object that extends along the length of the object and so that the fall-off of the magnitude of the radial external field with distance R from the center line of the object is in accordance with $1/R^n$, where n is less than 2 and greater than or equal to one, irrespective of the radial direction from the object.

38. A method according to claim 37, wherein the radial external magnetic field has a square wave pattern along the length of the object.

39. A method according to claim 37, wherein the radial external magnetic field has a sine wave pattern along the length of the object.

40. A method according to claim 37, wherein, in the course of the magnetizing of the ferromagnetic material, the elongated object is moved longitudinally.

41. A method according to claim 37, wherein the cycles of longitudinal magnetization are of equal length and the cycles of radial external magnetic field are of equal length.

42. A method of providing a magnetic signature in ferromagnetic material of an elongated object, comprising magnetizing the ferromagnetic material in a manner that results in multiple cycles of a radial external magnetic field around the object that extends along the length of the object over a plurality of meters, wherein each cycle includes a portion extending between polarity reversal points in which radial flux lines of one polarity emanate from the object throughout that portion and another portion extending between polarity reversal points in which radial flux lines of opposite polarity emanate from the object throughout the other portion, and wherein the magnitude of the radial external magnetic field varies progressively throughout each portion.

43. A method according to claim 42, wherein the portion of the cycles of radial external magnetic field are of equal length, and wherein the radial external magnetic field is substantially cylindrically symmetric.

44. A method according to claim 42, wherein the radial external magnetic field has a square wave pattern along the length of the object.

45. A method according to claim 42, wherein, in the course of the magnetizing of the ferromagnetic material, the elongated object is moved longitudinally.

46. A method of providing a magnetic signature in ferromagnetic material of an elongated object, comprising magnetizing the ferromagnetic material in a manner that creates multiple cycles of longitudinal magnetization that extends along the length of the object over a plurality of meters, in which the magnitude of the longitudinal magnetization varies progressively throughout each cycle, and wherein the longitudinal magnetization results in multiple cycles of a radial external magnetic field around the object, each cycle of the radial external magnetic field including a portion in which radial flux lines of one polarity emanate from the object throughout 360° and another portion in which radial flux lines of opposite polarity emanate from the object throughout 360°.

47. A method according to claim 46, wherein the fall-off of the magnitude of the radial external magnetic field with distance R from the center line of the object is in accordance with $1/R^n$, where n is between 2 and 1, irrespective of the radial direction from the object.

48. A method according to claim 46, wherein the radial external magnetic field extends continuously between polarity reversal points throughout the length of the elongated object.

49. A method according to claim 46, wherein multiple polarity reversing points of the multiple cycles of radial external magnetic field are spaced along the length of the object to define a wavelength of each cycle of the radial external magnetic field that is selected so that the fall-off of the magnitude of the radial external magnetic field with distance R from the center line of the object is in accordance with $1/R^n$, where n in between 2 and 1.

50. A method according to claim 46, wherein the radial external magnetic field has a square wave pattern along the length of the object.

51. A method according to claim 46, wherein the radial external magnetic field has a sine wave pattern along the length of the object.

52. A method according to claim 42, wherein, in the course of the magnetizing of the ferromagnetic material, the elongated object is moved longitudinally.

53. A method according to claim 46, wherein the radial flux lines are throughout each cycle of the radial external magnetic field between polarity reversal points.

54. A method according to claim 46, wherein the cycles of longitudinal magnetization are of equal length and the portions of the cycles of radial external magnetic field are of equal length, and wherein the radial flux lines emanate from the object throughout each portion.

55. A method of providing a magnetic signature in ferromagnetic material of an elongated object, comprising magnetizing the ferromagnetic material in a manner that produces multiple cycles of a radial external magnetic field around the object that extends along the length of the object and in a manner such that the fall-off of the magnitude of the radial external magnetic field with distance R from the center line of the object is in accordance with $1/R^n$, where n is between 2 and 1.

56. A method according to claim 55, wherein the radial external magnetic field has a square wave pattern along the length of the object.

57. A method according to claim 55, wherein the radial external magnetic field has a sine wave pattern along the length of the object.

58. A method according to claim 55, wherein, in the course of the magnetizing of the ferromagnetic material, the elongated object is moved longitudinally.

59. A method according to claim 55, wherein the cycles of the radial external magnetic field are of equal length and the radial external magnetic field is substantially cylindrically symmetric.

60. Apparatus for producing magnetization in ferromagnetic material of an elongated object, comprising, a magnetizer constructed to apply to said object a magnetic field that magnetizes the ferromagnetic material in a manner that creates multiple cycles of longitudinal magnetization that extends along the length of the object and that varies continually over each cycle, and that results in multiple cycles of a radial external magnetic field around the object that is substantially cylindrically symmetric and that extends along the length of the object, said magnetizer having a mechanism that provides relative movement between said object and said magnetizer along the length of said object.

61. Apparatus according to claim 60, wherein the magnetizer magnetizes the ferromagnetic material such that the cycles of the radial external magnetic field have a wavelength measured in meters.

62. Apparatus according to claim 60, wherein the cycles of longitudinal magnetization are of equal length and the cycles of radial external magnetic field are of equal length.

63. Apparatus for producing magnetization in ferromagnetic material of an elongated object, comprising, a magnetizer that applies to said object a magnetic field that magnetizes the ferromagnetic material in a manner that creates multiple cycles of longitudinal magnetization that extends along the length of the object and that varies continually over each cycle, and that results in multiple cycles of a radial external magnetic field around the object that is substantially cylindrically symmetric and that extends along the length of the object, said magnetizer having a mechanism that moves the object lengthwise relative to the magnetizer.

64. Apparatus according to claim 63, wherein the magnetizer magnetizes the ferromagnetic material such that the radial external magnetic field has a square wave pattern along the length of the object.

65. Apparatus according to claim 63, wherein the magnetizer magnetizes the ferromagnetic material such that the radial external magnetic field has a sine wave pattern along the length of the object.

66. Apparatus according to claim 63, wherein the magnetizer magnetizes the ferromagnetic material such that the fall-off of the magnitude of the radial external magnetic field with distance R from the center line of the object is in accordance with $1/R^n$, where n is between 2 and 1.

67. Apparatus according to claim 63, wherein the magnetizer magnetizes the ferromagnetic material such that the fall-off of the magnitude of the radial external magnetic field with distance R from the center line of the object is in accordance with $1/R^n$, where n is less than 2.

68. Apparatus according to claim 63, wherein the cycles of longitudinal magnetization are of equal length and the cycles of radial external magnetic field are of equal length.

69. Apparatus for providing a magnetic signature in ferromagnetic material of an elongated object, comprising, a magnetizer that applies to said object a magnetic field that magnetizes the ferromagnetic material in a manner that creates multiple cycles of longitudinal magnetization that extends along the length of the object and that varies continually over each cycle so as to produce multiple cycles of a radial external magnetic field around the object that extends along the length of the object and so that the fall-off of the magnitude of the radial external field with distance R from the center line of the object is in accordance with $1/R^n$, where n is between 2 and 1, irrespective of the radial direction from the object.

70. Apparatus according to claim 69, wherein the cycles of longitudinal magnetization are of equal length and the cycles of radial external magnetic field are of equal length.

71. Apparatus for providing a magnetic signature in ferromagnetic material of an elongated object, comprising, a magnetizer that magnetizes the ferromagnetic material in a manner that results in multiple cycles of a radial external magnetic field around the object that extends along the length of the object over meters, wherein each cycle includes a portion extending between polarity reversal points in which radial flux lines of one polarity emanate from the object throughout that portion and another portion extending between polarity reversal points in which radial flux lines of opposite polarity emanate from the object throughout the other portion, and wherein the magnitude of the radial external magnetic field varies progressively throughout each portion.

72. Apparatus according to claim 71, wherein the portions of the cycles of radial external magnetic field are of equal length and the radial external magnetic field is substantially cylindrically symmetric.

73. Apparatus for providing a magnetic signature in ferromagnetic material of an elongated object, comprising a magnetizer that magnetizes the ferromagnetic material in a manner that creates multiple cycles of longitudinal magnetization along the length of the object over meters, wherein the magnitude of the longitudinal magnetization varies progressively throughout each cycle, and wherein the longitudinal magnetization results in multiple cycles of a radial external magnetic field around the object, each cycle of the radial external magnetic field including a portion in which radial external flux lines of one polarity emanate from the object throughout 360° and another portion in which radial flux lines of opposite polarity emanate from the object throughout 360°.

74. Apparatus according to claim 73, wherein the magnetizer magnetizes the ferromagnetic material so as to produce multiple polarity reversing points of the multiple cycles of radial external magnetic field that are spaced along the length of the object to define a wavelength of each cycle of the radial external magnetic field determined so that the fall-off of the magnitude of the radial external magnetic field with distance R from the center line of the object is in accordance with $1/R^n$, where n is between 2 and 1.

75. Apparatus according to claim 73, wherein the cycles of longitudinal magnetization are of equal length and the portions of the cycles of the radial external magnetic field are of equal length and the radial external flux lines emanate from the object throughout each portion, and wherein the radial external magnetic field is substantially cylindrically symmetric.

76. Apparatus for providing a magnetic signature in ferromagnetic material of an elongated object, comprising a magnetizer that magnetizes the ferromagnetic material in a manner that produces multiple cycles of a radial external magnetic field around the object that extends along the length of the object, and in a manner such that the fall-off of the magnitude of the radial external magnetic field with distance R from the center line of the object is in accordance with $1/R^n$, wherein n is between 2 and 1.

77. Apparatus according to claim 76, wherein the cycles of the radial external magnetic field are of equal length and the radial external magnetic field is substantially cylindrically symmetric.

\* \* \* \* \*